Feb. 1, 1966  R. L. ATHERTON ETAL  3,232,006
MEANS FOR APPLYING CHEMICALS OVER LAWNS OR THE LIKE
Filed June 14, 1962
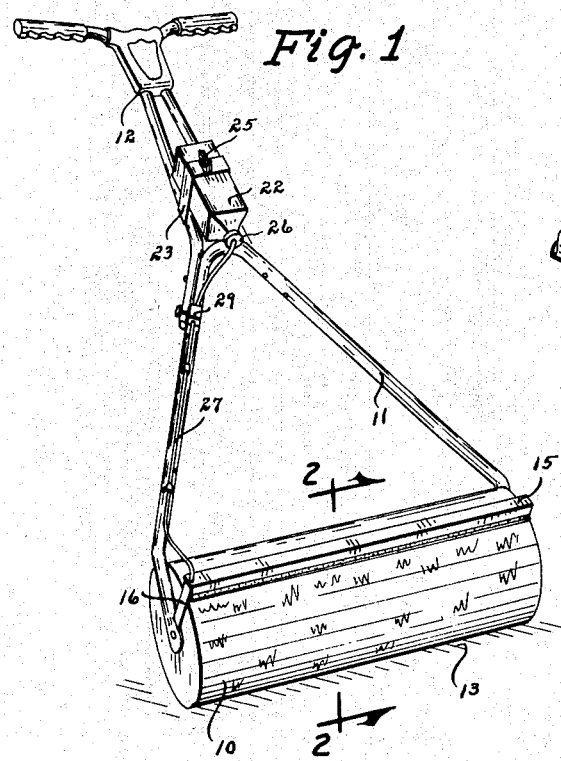
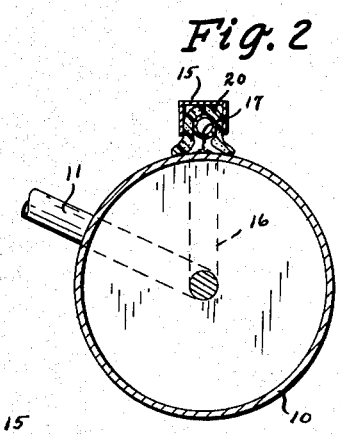
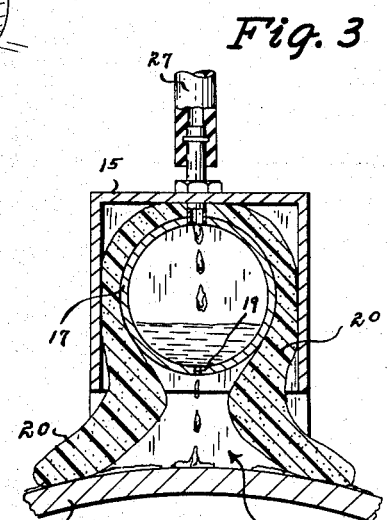
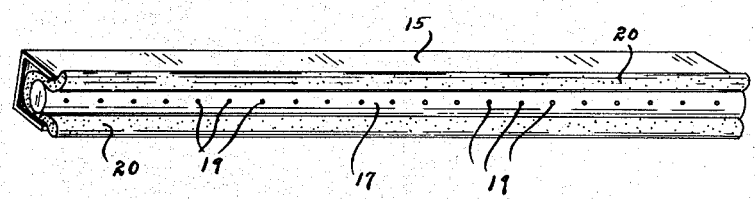
INVENTOR
ROY L. ATHERTON
BY ALFRED J. PIEL
Talbert Dick & Barley
ATTORNEYS United States Patent Office 3,232,006
Patented Feb. 1, 1966

3,232,006
MEANS FOR APPLYING CHEMICALS OVER LAWNS OR THE LIKE
Roy L. Atherton, Eldora, Iowa and
Alfred J. Piel, Hubbard, Iowa
Filed June 14, 1962, Ser. No. 202,609
3 Claims. (Cl. 47—1.5)

This invention relates to an applicator means and more particularly to a device for applying insecticides, fertilizers, germicides, obnoxious vegetation killing chemicals, and like.

It is now common practice to apply chemicals over lawns, fields, highways, roadway parks, golf courses, or like to fertilize certain vegetation thereon, to kill obnoxious growths such as weeds thereon, and to kill and/or control insects. Usually the chemical application is accomplished by spraying, fogging or like. The objections to such methods of chemical treatment are that the chemicals may well dangerously drift beyond the area desired to be treated, and also much of the chemical required for a given task is economically wasted by unneeded spot concentrations over the field, yard, or like being sprayed or fogged. In many instances the chemicals are of a poisonous character, dangerous to man, animals, and birds. Perhaps the chief problem is experienced with weed killing chemicals. While the chemicals will kill weeds, it will also kill many desirable plants such as roses, garden flowers, certain vegetables and like. It is almost impossible to spray or fog an area without the wind drifting the chemicals to adjacent areas. Furthermore the chemicals have an objectionable odor and even if the specific chemicals being used at the moment are not poisonous they should not be inhaled.

Therefore one of the principal objects of our invention is to provide a method of and means for applying chemicals to yards, fields, ground surfaces and like, that will not conduct the chemicals being used, beyond the area actually being treated, regardless of wind velocity.

A further object of this invention is to provide a chemical applicator that applies all the chemical onto the area to be treated, thereby eliminating the wasting of the chemical.

A still further object of this invention is to provide a chemical applicator that will evenly and uniformly spread the chemicals over the surface area to be treated.

A still further object of this invention is to provide a chemical applicator device that may be used without harm to the operator.

A still further object of this invention is to provide a chemical applicator that permits volume adjustment control.

A still further object of this invention is to provide a chemical applicator device that permits visual inspection of the amount of chemical being dispensed.

A still further object of this invention is to provide a chemical applicator means that prevents wastage of the chemical into the soil of the area being treated.

Still further objects of our invention are to provide a chemical applying means that is economical in manufacture and durable in use.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

FIG. 1 is a perspective view of our chemical applicator.
FIG. 2 is an enlarged cross-sectional view of the roller unit and is taken on line 2—2 of FIG. 1.
FIG. 3 is an enlarged cross-sectional view of the chemical supply portion of the device and more fully illustrates its construction, and
FIG. 4 is an enlarged underside perspective view of the chemical supply portion of the device.

In these drawings we have used the numeral 10 to designate an elongated cylindrical roller.

The numeral 11 designates an A-frame having its two lower forward ends operatively rotatably mounted by any suitable means to the two center ends respectively, of the roller 10. The numeral 12 designates a handle means on the upper rear end of the frame 11. By this construction the vehicle may be easily pushed or pulled over the surface 13 by use of the handle means 12. The elongated roller or cylinder 10 will roll over the surface 13 in the manner of a wheel. The entire unit may be of relatively light weight.

Extending in spaced relationship and above the longitudinal periphery of the roller 10 is an inverted trough member 15. This inverted trough member has its two ends supported by braces 16 which are connected to the forward ends of the frame 11.

Secured in the trough 15 and spaced from its top and sides is a pipe manifold 17 having a row of holes 19 in its bottom length. The inverted trough and the pipe 17 have lengths substantially equal to the longitudinal length of the cylinder roller 10, as shown in FIG. 1.

Secured between the trough 15 and manifold pipe 17 and coextensive in length therewith is a flexible resilient liquid absorbing inverted trough shaped pad wiper bar 20 having its longitudinal center between the inside bottom of the trough 15 and top of pipe 17. The two side areas of the pad, extend downwardly at each side of the pipe 17, respectively and then exit from the inverted trough 15, downwardly and outwardly away from each other to slidably engage the periphery of the roller 10, as shown in FIG. 3. By this construction the two side portions of the pad 20 will wipe on the periphery of the roller 10 at spaced longitudinal lines, thus leaving an open area 21 between these two side areas and under the pipe 17. The numeral 22 designates a container detachably secured to the handle means of the unit by a belt 23 and clamping screw 25. The detachable screw cap 26 of the container 22 extends forwardly and downwardly as shown in FIG. 1. The numeral 27 designates a flexible transparent conduit having one end communicating with the inside of the cap 26 and its other end communicating with the inside of the pipe 17. The numeral 29 designates a valve means imposed in the conduit 27. The wiper pad has its longitudinal length extending substantially the length of the cylindrical roller 10, and may be of any suitable flexible and resilient material such as sponge rubber, foam rubber or like.

The container 22 is filled with the chemical or chemicals to be applied. When the adjustable valve means 29 is opened, the fluid will flow downwardly from the container through the conduit and into the pipe 17. From the pipe 17 the fluid 30 will drip through the holes 19 and fall onto the top periphery surface of the roller 10, as shown in FIG. 3.

This dripping fluid will fall upon the roller between the two spaced side wiping areas of the pad, and regardless of which direction the roller turns, there will be a flexible resilient lip to spread, coat and wipe the chemical onto the peripheral top of the roller. As the roller continues to rotate, this coated surface of the roller will move to the bottom and in turn will deposit a coating of the chemical onto all matter upon which the roller travels. If the matter is grass, weeds or like, the chemical will be applied directly to the vegetation, evenly and uniformly. None of the chemical will be introduced into the air. A surface area may be chemically treated without any danger of affecting even closely adjacent areas.

The continued application of the chemical is automatic as the device is rolled over the area to be treated. By observing the roller surface moving toward the ground surface, or observing the transparent conduit, one may observe the volume flow of the chemical being dispensed. If a new supply of chemical is needed or if a different chemical is desired, the container may be refilled accordingly, or if desired the container may be discarded and a new filled container substituted. By the wiper being at one side of the chemical dripping into the roller, the chemical will not be filtered through or clog the liquid absorbing pad.

When no more chemical fluid is desired on the roller 10, the valve means is closed. The resilient flexible pad distributing bar wiper will be held in proper position by the inverted trough and pipe 17.

Some changes may be made in the construction and arrangement of our method of and means for applying chemicals without departing from the real spirit and purpose of our invention, and it is our intention to cover by our claims, any modified forms of structure or use of mechanical equivalents which may be reasonably included within their scope.

We claim:
1. In a ground surface chemical applicator, comprising, in combination,
   a frame portion,
   an elongated roller rotatably secured to said frame,
   a handle on said frame,
   a container operatively secured to said frame,
   an elongated manifold pipe extended in spaced relationship over the longitudinal upper periphery of said roller; said pipe having outlet holes,
   a conduit extending from the inside of said container to the inside of said manifold pipe,
   a flexible resilent liquid absorbing elongated element having its width wrapped over the said manifold pipe and having its two side edge areas in contact with the periphery of said roller, and an inverted trough member extending longitudinally of said pipe and elongated element and embracing the top and two sides of the latter.

2. In a ground surface chemical applicator, comprising, a combination,
   a frame portion,
   an elongated roller rotatably secured to said frame,
   a handle on said frame,
   a container operatively secured to said frame,
   an elongated manifold pipe extended in spaced relationship over the longitudinal upper periphery of said roller; said pipe having outlet holes,
   a conduit extending from the inside of said container to the inside of said manifold pipe,
   a flexible resilient liquid absorbing elongated element having its width wrapped over the said manifold pipe and having its two side edge areas in contact with the periphery of said roller; said outlet holes of said pipe being in the bottom of said pipe and between the two side edge areas of said elongated element, and a trough member extending longitudinally of said pipe and elongated element and engaging the latter.

3. In a ground surface chemical applicator, comprising, in combination,
   a frame portion,
   an elongated roller rotatably secured to said frame,
   a handle on said frame,
   a container operatively secured to said frame,
   an elongated manifold pipe extended in spaced relationship over the longitudinal upper periphery of said roller; said pipe having outlet holes,
   a conduit extending from the inside of said container to the inside of said manifold pipe,
   a flexible resilient liquid absorbing elongated element having its width wrapped over the said manifold pipe and having its two side edge areas in contact with the periphery of said roller; said outlet holes of said pipe being in the bottom of said pipe and between the two side edge areas of said elongated element, and an inverted trough member extending longitudinally of said pipe and elongated element and embracing the top and two sides of the latter.

References Cited by the Examiner

UNITED STATES PATENTS

| 207,160 | 8/1878 | Brown | 15—573 |
| 812,087 | 2/1906 | Peterson | 15—571 X |
| 2,266,880 | 12/1941 | Levenhagen | 118—261 X |
| 2,696,696 | 12/1954 | Tigerman | 47—1 |
| 2,951,256 | 9/1960 | Hulsh | 15—573 X |
| 2,951,314 | 9/1960 | Laughlin | 47—1 |
| 3,076,995 | 2/1963 | Rabelow | 15—573 X |

FOREIGN PATENTS

| 1,159,307 | 2/1958 | France. |
| 338,163 | 11/1930 | Great Britain. |
| 849,740 | 9/1960 | Great Britain. |

ABRAHAM G. STONE, *Primary Examiner.*

T. GRAHAM CRAVER, *Examiner.*